(12) United States Patent
Sudrat et al.

(10) Patent No.: US 11,115,237 B2
(45) Date of Patent: Sep. 7, 2021

(54) METHOD FOR FAULT TOLERANT MESSAGE TRANSMISSION IN A COMPUTER NETWORK AND COMPUTER NETWORK

(71) Applicant: TTTech Computertechnik Aktiengesellschaft, Vienna (AT)

(72) Inventors: Erwan Sudrat, Vienna (AT); Günther Bauer, Vienna (AT)

(73) Assignee: TTTECH INDUSTRIAL AUTOMATION AG, Vienna (AT)

( * ) Notice: Subject to any disclaimer, the term of this patent is extended or adjusted under 35 U.S.C. 154(b) by 171 days.

(21) Appl. No.: 16/050,036

(22) Filed: Jul. 31, 2018

(65) Prior Publication Data

US 2019/0044752 A1    Feb. 7, 2019

(30) Foreign Application Priority Data

Aug. 4, 2017 (EP) ..................... 17184876

(51) Int. Cl.
*H04L 12/437* (2006.01)
*H04L 12/947* (2013.01)
*H04L 12/24* (2006.01)
*H04L 12/40* (2006.01)
*H04L 29/14* (2006.01)
*H04L 29/08* (2006.01)
H04L 12/427 (2006.01)

(52) U.S. Cl.
CPC ...... *H04L 12/437* (2013.01); *H04L 12/40058* (2013.01); *H04L 41/0654* (2013.01); *H04L 49/25* (2013.01); *H04L 67/1095* (2013.01); *H04L 69/40* (2013.01); *H04L 12/427* (2013.01)

(58) Field of Classification Search
CPC .............. H04L 12/40058; H04L 69/40; H04L 41/0654; H04L 12/437; H04L 49/25; H04L 67/1095; H04L 12/427
See application file for complete search history.

(56) References Cited

FOREIGN PATENT DOCUMENTS

| WO | 2012/010619 A1 | 1/2012 |
| WO | 2014/083381 A1 | 6/2014 |

OTHER PUBLICATIONS

European Search Report issued in application No. 17184876.5, dated Feb. 1, 2018 (9 pages).

(Continued)

*Primary Examiner* — Mandish K Randhawa
(74) *Attorney, Agent, or Firm* — Eversheds Sutherland (US) LLP

(57) ABSTRACT

The invention describes a method and a computer network for fault tolerant message transmission. Nodes of the network are connected to form a ring network. Nodes in the network form a summation group. For transmitting messages from the nodes of the summation group to a switch edge, nodes of the summation group generate and send summation frames. If a node participating in the summation group determines the non-arrival of a summation frame, it generates first recovery frame, inserts its message into said recovery frame, and sends this first recovery frame in the direction of the summation frame, which it was expecting. After sending the first recovery frame, it generates a second recovery frame, inserts its messages into said second right direction recovery frame, and sends said second right direction recovery frame to the switch.

20 Claims, 10 Drawing Sheets

(56) References Cited

OTHER PUBLICATIONS

Knezic, Mladen et al., "Topology Aspects in EtherCAT Networks," 14th International Power Electronics and Motion Control Conference, EPE-PEMC 2010, T1-1-T1-6 (6 pages).

Prytz, Gunnar et al., "Redundant and Synchronized EtherCAT Network," Industrial Embedded Systems (SIES), 2010 IEEE International Symposium, pp. 201-204.

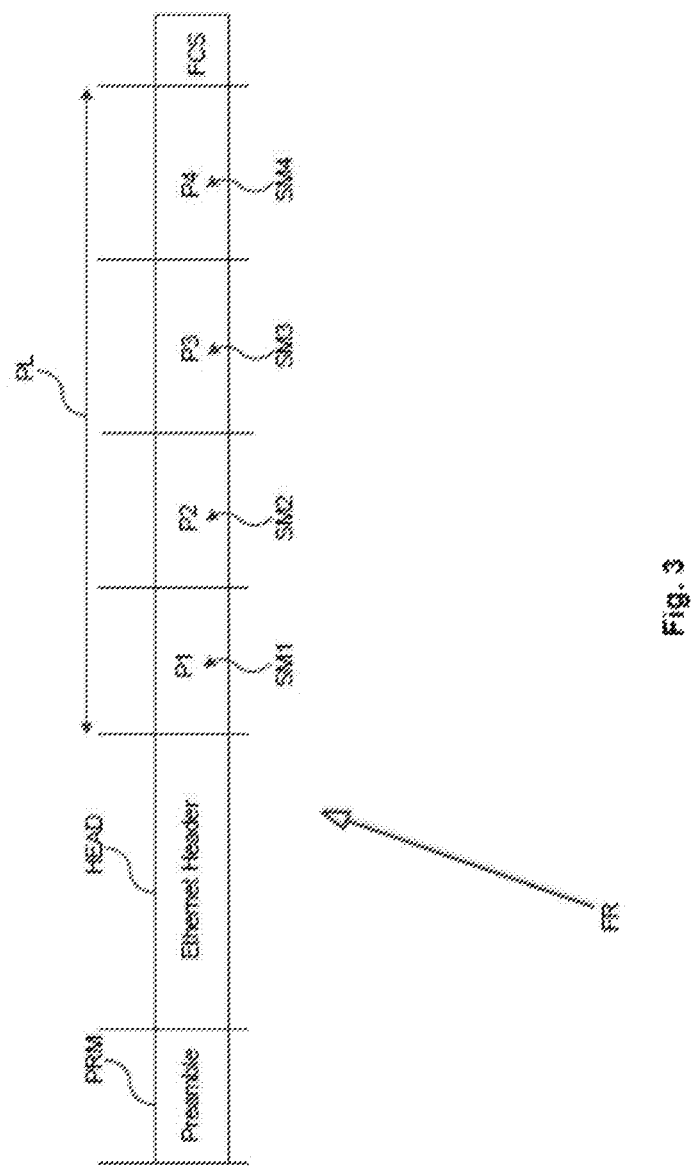

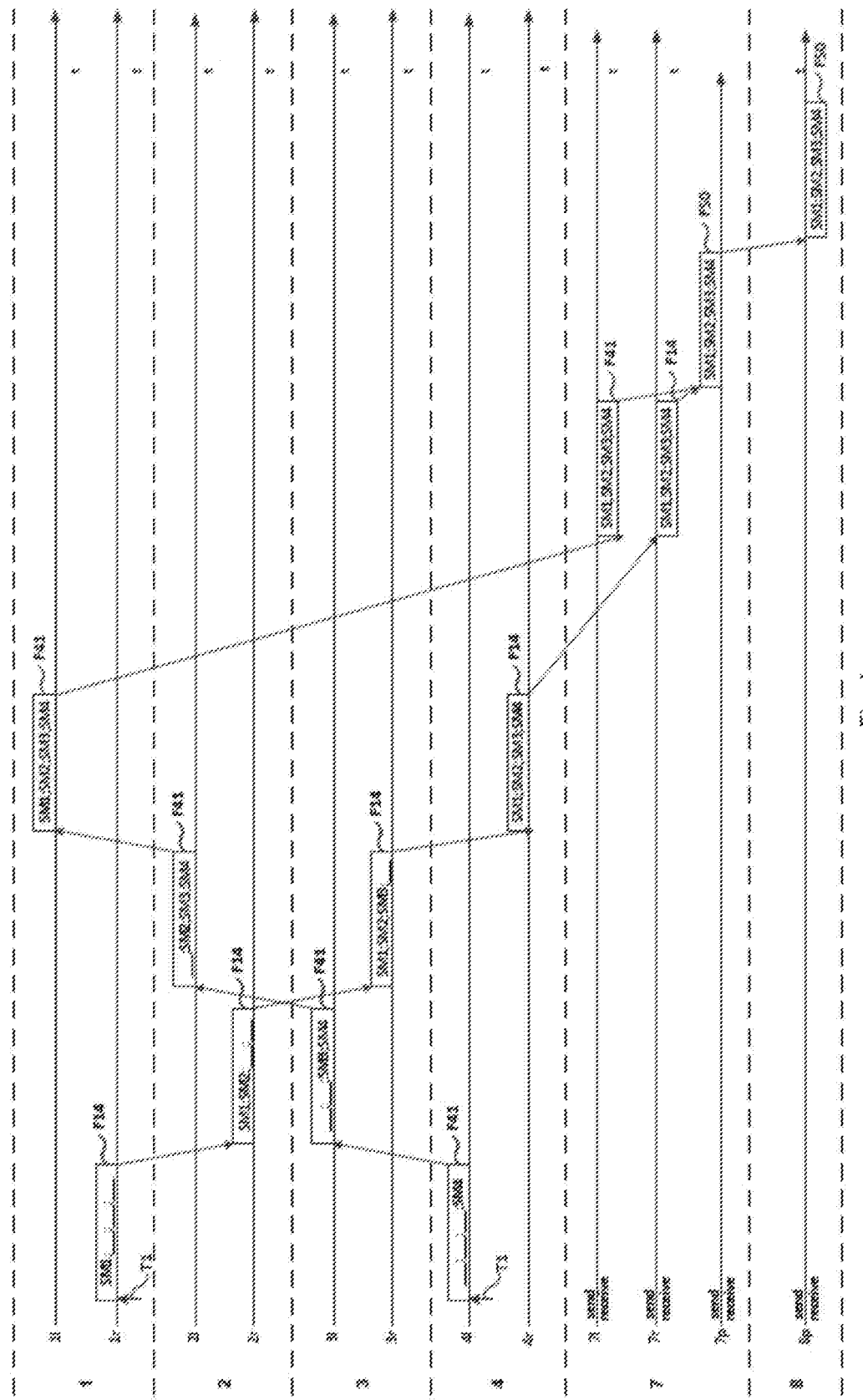

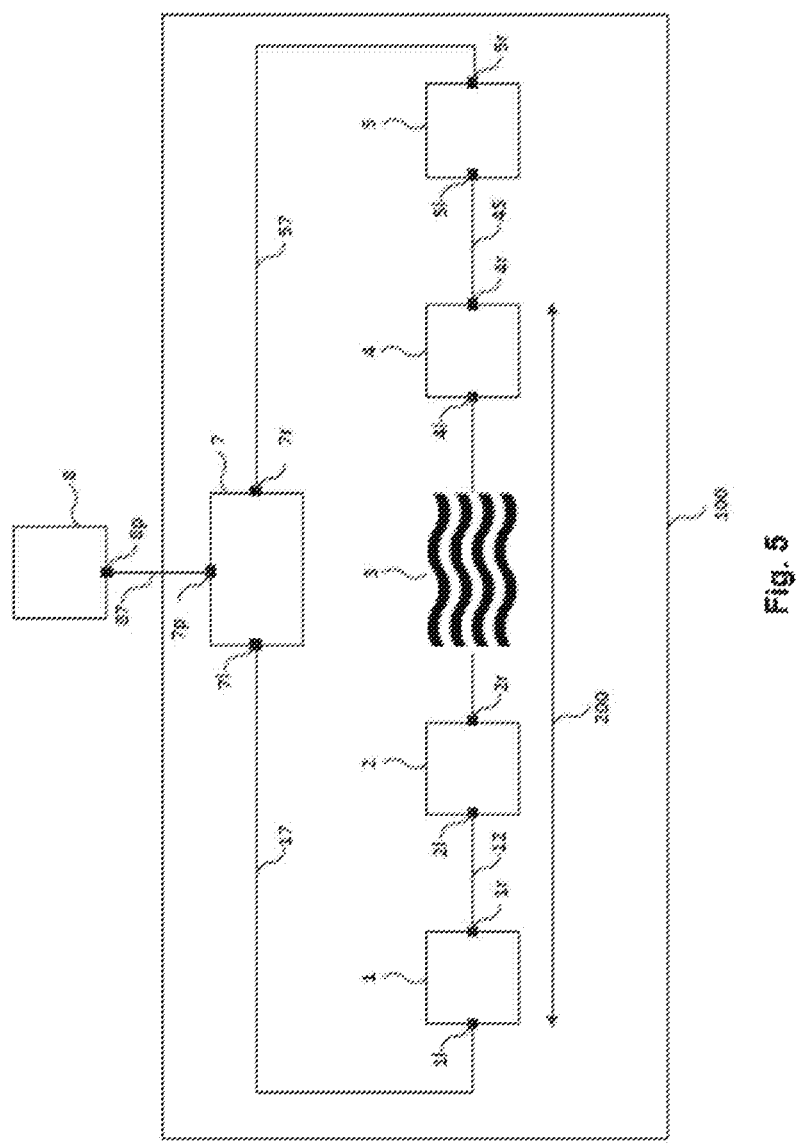

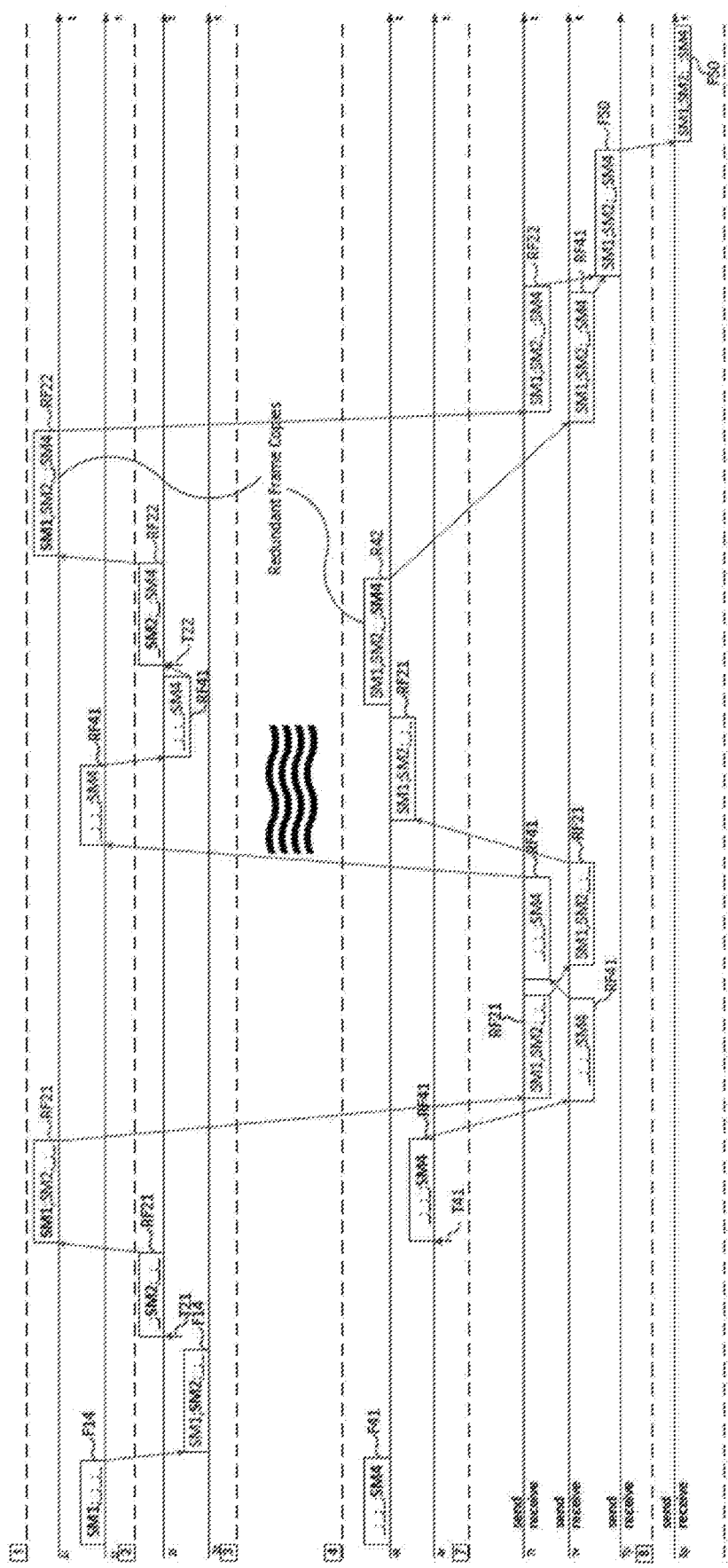

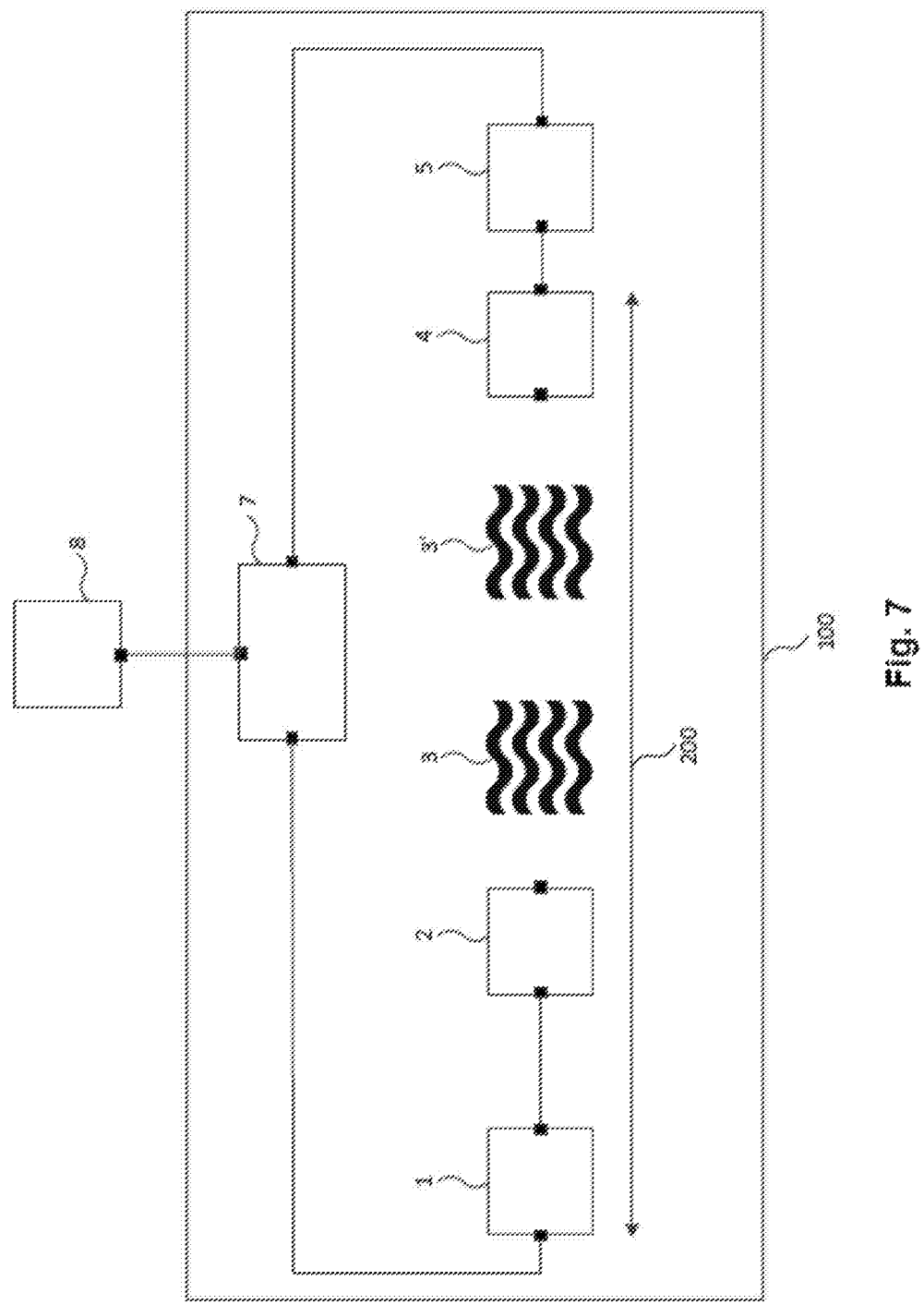

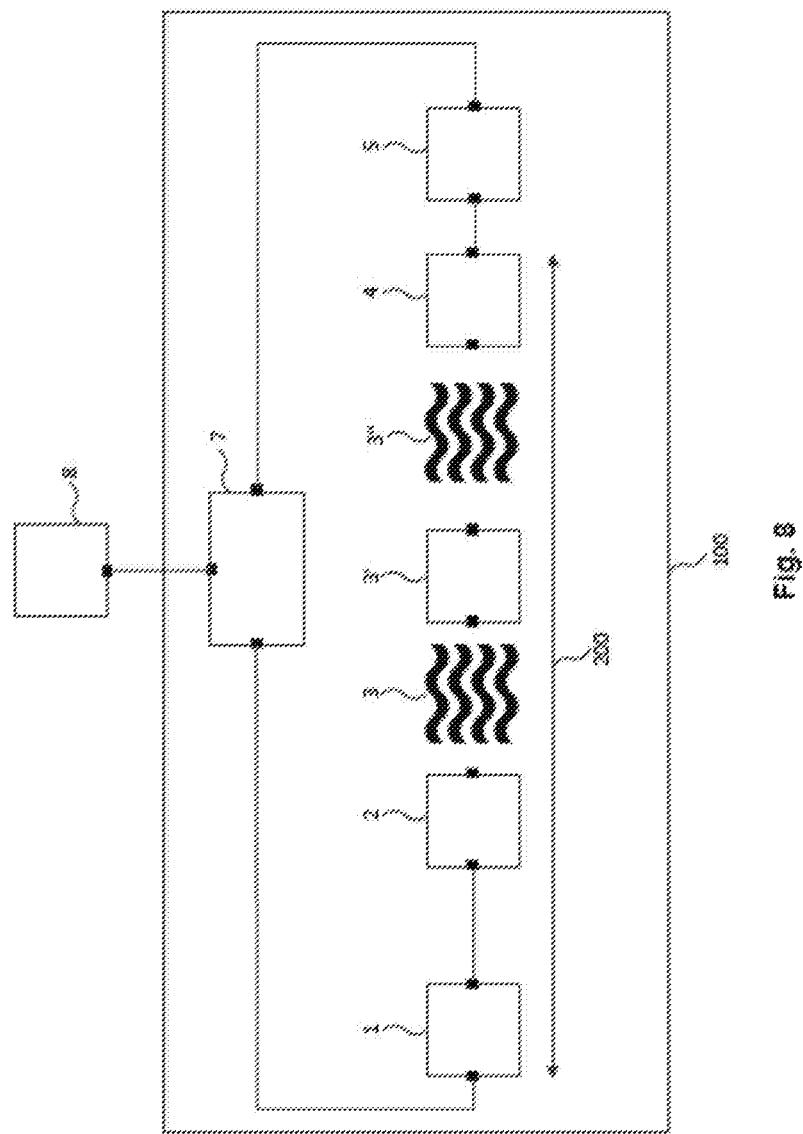

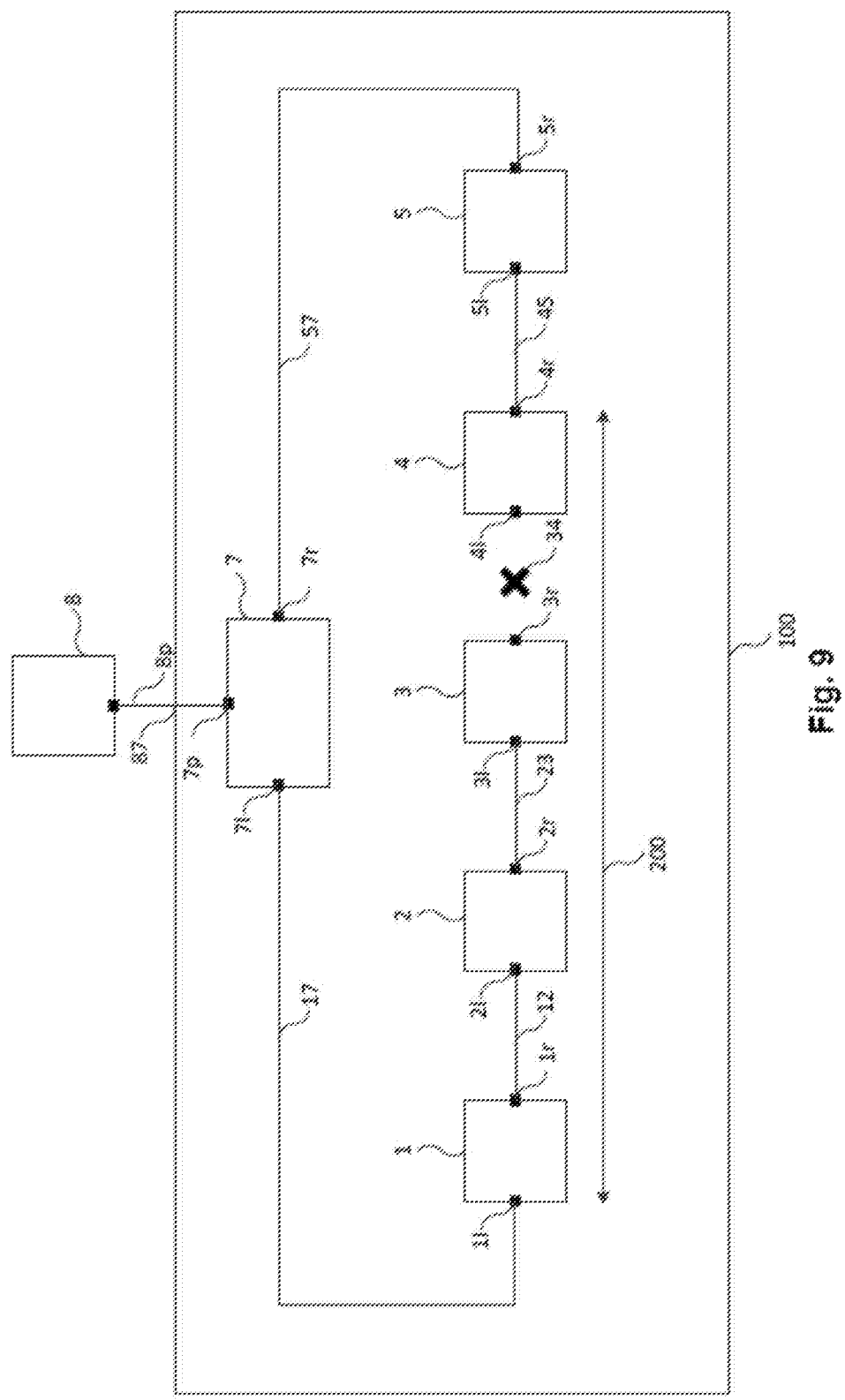

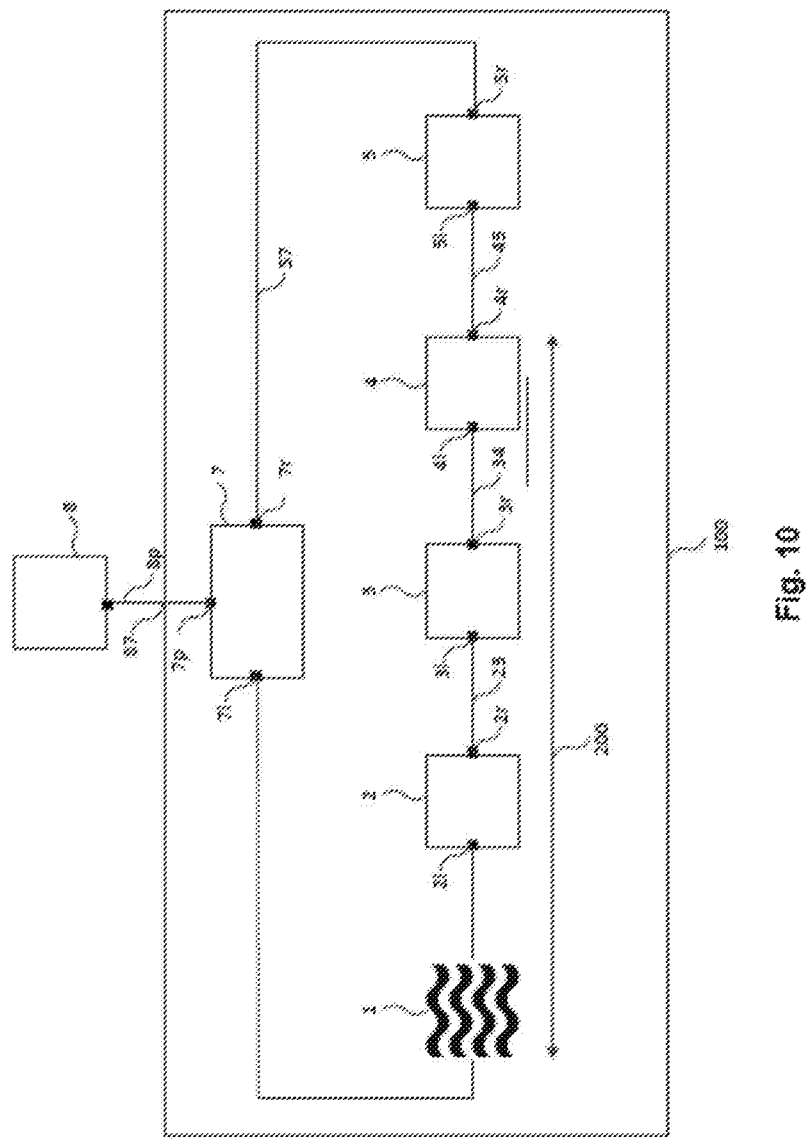

METHOD FOR FAULT TOLERANT MESSAGE TRANSMISSION IN A COMPUTER NETWORK AND COMPUTER NETWORK

CROSS-REFERENCE TO RELATED APPLICATIONS

The disclosure claims priority to and the benefit of European Application No. 17184876.5, filed Aug. 4, 2017, which is incorporated by reference herein in its entirely.

BRIEF DESCRIPTION

The invention relates to a method for fault tolerant message transmission in a computer network, where said computer network comprises nodes and connections, wherein said nodes are connected by the connections to form a ring network.

Further, the invention relates to a computer network, in particular a time-triggered computer network, for fault tolerant message transmission, wherein said computer network comprises nodes and connections, wherein said nodes are connected by the connections to form a ring network.

The invention relates to the general area of information exchange in computer systems, in particular in those computer systems in which the temporal aspect of the information exchange is relevant, e.g., computer systems used for real-time applications.

It is an object of the invention to provide a novel method for redundancy management for computer networks, in particular real-time computer networks, with a ring topology.

This object is achieved with a method described in the introduction, wherein according to the invention two or more nodes in said ring network form a summation group, wherein said summation group contains one left edge node, one right edge node and zero, one, or more nodes between said left and right edge nodes, and wherein for transmitting messages from the nodes of the summation group to a switch in the computer network the left edge node of the summation group generates a right direction summation frame and sends said right direction frame through its right side port towards the right edge node, wherein the right edge node of the summation group generates a left direction summation frame and sends said left direction frame through its left-side port towards a right side port of the left edge node, wherein each of the nodes participating in the summation group inserts, before sending the right direction summation frame to its right-side neighbor node or, in case of the right edge node to the switch, its message, which is intended by the respective node for being transmitted to the switch, into the right-side summation frame and forwards the summation frame to its right-side neighbor node or to the switch, and wherein each of the nodes participating in the summation group inserts, before sending the left direction summation frame to its left-side neighbor node or, in case of the left edge node to the switch, its before mentioned message, which is intended by the respective node for being transmitted to the switch, into the left direction summation frame and forwards the summation frame to its left-side neighbor node or to the switch, and wherein a node participating in the summation group which detects a non-arrival of a right direction summation frame, for instance the non-arrival at a defined point in time or within a period of time from after defined point in time, from its left-side neighbor node generates a first right direction recovery frame, inserts its message into said right direction recovery frame and sends the first right direction recovery frame rightwards, and wherein only nodes which would insert their message into a right direction summation frame insert their message into the right direction recovery frame moving rightwards, and/or a node participating in the summation group which determines the non-arrival of a left direction summation frame, for instance the non-arrival at a defined point in time or within a period of time after a defined point in time, from its right-side neighbor node generates a first left direction recovery frame, inserts its message into said recovery frame and sends this first left direction recovery frame leftwards, wherein only nodes which would insert their message into a left direction summation frame insert their message into the left-direction recovery frame moving leftwards, and wherein 1) in the case that a node has detected the non-arrival of a right direction summation frame, said node—after sending the first right direction recovery frame—generates a second right direction recovery frame, inserts its messages into said second right direction recovery frame and sends said second right direction recovery frame to the switch, and/or wherein 2) in the case that a node has detected the non-arrival of a left direction summation frame, said node—after sending the first left direction recovery frame—generates a second left direction recovery frame, inserts its messages into said second left direction recovery frame and sends said second left direction recovery frame to the switch, and/or wherein 3) in the case that a node has detected the non-arrival of a right direction summation frame and a node has detected the non-arrival of a left direction summation frame, the first right direction recovery frame is being received by the node which has determined the non-arrival of the left direction summation frame, and the first left direction recovery frame is being received by the node which has determined the non-arrival of the right direction summation frame, and wherein the node which has detected the non-arrival of the left direction summation frame consumes the first right direction recovery frame, generates a second left direction recovery frame, inserts its message and all messages contained in said first right direction recovery frame into said second left direction recovery frame, and transmits said second left direction recovery frame to the switch, wherein the node which has detected the non-arrival of the right direction summation frame consumes the first left direction recovery frame, generates a second right direction recovery frame, inserts its message and all messages contained in said first left direction recovery frame into said second right direction recovery frame, and transmits said second right direction recovery frame to the switch.

In the context of this text, the term "switch" means switch, or router, or bridge. The term "switch" may also denote any network device which is capable of executing the necessary functions described in connection with the invention described.

Furthermore, this object is achieved with a computer network described in the introduction, wherein according to the invention two or more nodes in said ring network form a summation group, wherein said summation group contains one left edge node, one right edge node and zero, one, or more nodes between said left and right edge nodes, and wherein for transmitting messages from the nodes of the summation group to a switch in the computer network the left edge node of the summation group is configured to generate a right direction summation frame and to send said right direction frame through its right side port towards the right edge node, wherein the right edge node of the summation group is configured to generates a left direction summation frame and to send said left direction frame through its left-side port towards a right side port of the left edge node, wherein each of the nodes participating in the summation group is configured to insert, before sending the right direction summation frame to its right-side neighbor node or, in case of the right edge node to the switch, its message, which is intended by the respective node for being transmitted to the switch, into the right-side summation frame and to forward the summation frame to its right-side neighbor node or to the switch, and wherein each of the nodes participating in the summation group is configured to insert, before sending the left direction summation frame to its left-side neighbor node or, in case of the left edge node to the switch, its before mentioned message, which is intended by the respective node for being transmitted to the switch, into the left direction summation frame and to forward the summation frame to its left-side neighbor node or to the switch, and wherein the nodes of the summation group are configured such that a node participating in the summation group which detects a non-arrival of a right direction summation frame, for instance the non-arrival at a defined point in time or within a period of time from after defined point in time, from its left-side neighbor node generates a first right direction recovery frame, inserts its message into said right direction recovery frame and sends the first right direction recovery frame rightwards, and wherein the nodes of the summation group are configured such that only nodes of the summation group which would insert their message into a right direction summation frame insert their message into the right direction recovery frame moving rightwards, and/or the nodes of the summation group are configured such that a node participating in the summation group which determines the non-arrival of a left direction summation frame, for instance the non-arrival at a defined point in time or within a period of time after a defined point in time, from its right-side neighbor node generates a first left direction recovery frame, inserts its message into said recovery frame and sends this first left direction recovery frame leftwards, wherein the nodes of the summation group are configured such that only nodes which would insert their message into a left direction summation frame insert their message into the left-direction recovery frame moving leftwards, and wherein the nodes of the summation group are configured such that 1) in the case that a node has detected the non-arrival of a right direction summation frame, said node—after sending the first right direction recovery frame—generates a second right direction recovery frame, inserts its messages into said second right direction recovery frame and sends said second right direction recovery frame to the switch, and/or wherein 2) in the case that a node has detected the non-arrival of a left direction summation frame, said node—after sending the first left direction recovery frame—generates a second left direction recovery frame, inserts its messages into said second left direction recovery frame and sends said second left direction recovery frame to the switch, and/or wherein 3) in the case that a node has detected the non-arrival of a right direction summation frame and a node has detected the non-arrival of a left direction summation frame, the first right direction recovery frame is being received by the node which has determined the non-arrival of the left direction summation frame, and the first left direction recovery frame is being received by the node which has determined the non-arrival of the right direction summation frame, and wherein the node which has detected the non-arrival of the left direction summation frame consumes the first right direction recovery frame, generates a second left direction recovery frame, inserts its message and all messages contained in said first right direction recovery frame into said second left direction recovery frame, and transmits said second left direction recovery frame to the switch, wherein the node which has detected the non-arrival of the right direction summation frame consumes the first left direction recovery frame, generates a second right direction recovery frame, inserts its message and all messages contained in said first left direction recovery frame into said second right direction recovery frame, and transmits said second right direction recovery frame to the switch.

Moreover, the object is achieved with a computer network described above which is configured to execute a method according to the invention.

Finally, the invention refers to a node for a computer network, which node is configured to execute the node-specific features as described in this text.

The invention presents a novel method for redundancy management for real-time systems in ring network topologies. In a ring network, network nodes are connected to each other in a circular shape and each node is connected to exactly two nodes. A ring network does not need a central management node and it is easy to identify a link failure due to point-to-point connection between single nodes. Data is transferred from node to node, and this transfer may be bidirectional, as provided in the present invention. Data can be traveling in both directions around the ring. Such, in a case of a single node failure, data can still be transferred between two nodes using the other transfer direction, making such a ring tolerant to single failures.

According to the present invention, two, three or more nodes in a ring form a summation group. Nodes in a summation group participate in the creation, modification and transfer of summation frames. A summation frame contains two or more messages and nodes in the summation group can produce and consume this sub-messages. In general, a node can be configured to read (consume) a configurable number of messages per summation frame.

The invention deals with many-to-one communication (communication from several producers to one single consumer) where two or more nodes participating in the summation group produce messages in the summation frame, and one node consumes them (this node does not belong to the summation group). Summation frames enable high efficient use of bandwidth while low latency.

In the case of no failure, i.e. if all nodes and the links (connections between the nodes) between the nodes are working properly, the summation frames are transmitted to the switch. If the a summation frame is lost or its delivery so much delayed, that it misses the transmission window (e.g., due to a node failure and/or of a link), the mechanism of recovery frames is triggered. Recovery frames ensure that the correct communication with all the other connected nodes is preserved. Using summation frames in the ring with the concept of recovery frames from this invention ensures the transfer of data even if one node or connection in the summation group fails.

A switch in the computer network may act as a simple "receiver" of summation frames and/or second recovery frames. In this case the switch does not consume these frames, but it decides, as will be described in the following, if summation frames, or in the case of second recovery frames, said summation frames or second recovery frames may be accepted, and if such a frame can be accepted, it will be transmitted by the switch to at least one consumer (consuming node) outside of the ring network, which at least one consumer consumes (uses) the frames which it receives from the switch.

In another embodiment it may also be provided that the switch itself acts as a consumer. In this case the switch decides if a frame can be accepted, as described above, and consumes the frames itself. In addition, it may be provided that the switch also transmits the accepted frames to one or more consumers outside of the ring network.

Advantageous embodiments of this method, the computer network and the nodes used in this network are detailed in the following. With respect to the network, it is the network which is configured to execute and/or realize the features described in the following, preferably—if not stated otherwise—the nodes of the summation group are configured to execute and/or realize the (node-specific) features described.

In the case of no failure the switch receives, and/or accepts and/or consumes at least one, preferably one of the summation frames which the switch receives.

It may be provided that the switch according to 1) and 2) accepts and/or consumes the right or left direction second recovery frame which it receives, or according to 3) accepts and/or consumes at least one, preferably one of the second recovery frames which the switch receives.

In the case of a fault of at least one node of the summation group, and/or the fault of a node being physically arranged within the summation group (but not belonging to the summation group), and/or a link connecting nodes, at least one, in particular one of the second recovery frames (or the one second recovery frame) is the surrogate summation frame, instead of the "normal" summation frames, which contains all messages of the nodes of the summation group, except the message of the node or the messages of the nodes of the summation group, which is/are faulty.

The switch may, as described above, accept summation frames and transmits a summation frame to a node (or more nodes), which consumes the frame. The switch, however, may also be configured to accept and consume such summation frames. Preferably, the switch only consumes and/or accepts at least one or one of the summation frames, if said summation frames received by the switch are identical.

Preferably, the switch according to 3) only consumes and/or accepts at least one or one of the second recovery frames, if said recovery frames received by the switch are identical.

Exactly spoken, if the data streams, which correspond to the second left direction recovery frame and the second right direction recovery frame (or, in the case of summation frames to the right and the left direction summation frame), which recovery frames should contain the messages of all non-faulty nodes of the summation group (or of all nodes of the summation group), are identical, the switch will accept the recovery (or summation) frames and will transmit one of said frames to a receiver, and/or will consume said frame.

Preferably, it may be provided that nodes of the summation group write their message into a well-defined position in the summation frames.

In particular, it is of advantage that each node of the summation group writes its message into a well-defined position into a right-direction summation frame, which well-defined position is identical to the well-defined position, into which said node writes its message into the corresponding left-direction summation frame.

This means, that a left and a right direction summation frame, which are sent at the same point in time (or within a defined time interval around a defined point in time, in which time interval only one left direction summation frame and one right direction summation frame are transmitted) represent identical data streams.

Furthermore, it may be provided that each node of the summation group writes its message into a recovery frame on the same position as it would write said message into a summation frame.

In particular, it may be provided that the nodes participating in the summation group are synchronized to a clock in the network, and preferably it is provided that the edge nodes generate and/or send the summation frames and/or recovery frames (first and/or second) at scheduled points in time.

It may then be provided that nodes of the summation group receive summation frames at scheduled points in time, wherein a node sends a first recovery frame if it does not receive a summation frame at a scheduled point in time or within a defined time interval after said point in time.

Preferably it is provided that each summation frame belongs to a data stream, wherein this data stream is uniquely identified by a unique identifier, preferably with a unique combination of Ethernet header, IP, and UDP header.

Preferably, a redundancy tag is added to the summation frames and/or to the second recovery frames for the elimination of redundant frame copies, preferably to enable IEEE 802.1CB redundancy mechanisms.

A redundancy tag consists of general, preconfigured information and a sequence number. Edge nodes increase this sequence number after sending of each summation frame. Thus, sequence numbers (and potential additional meta information) will be transported in a dedicated redundancy tag within the Ethernet frame similar to a VLAN tag. This redundancy mechanism will eliminate duplicates (i.e. redundant copies of the same frame), but will likely not guarantee in-order delivery of the frames. To avoid problems where edge nodes are not generating the same sequence for the same frames (e.g., the sequence number counter on one node had to be reset after a device replacement), the redundancy tag is always inserted by the last edge node in the direction of the consuming node.

The edge node creating the summation frame inserts the redundancy tag with the current value of its sequence counter. The last edge node reads the sequence counter and if the value is higher than its own current sequence counter, it takes over the new value read from the frame and inserts the redundancy tag into the summation frame.

To ensure that both frames leaving the summation frame group are identical, the edge nodes introduce the same MAC address as source address. This MAC address does not match the original MAC address of the physical device, but represents the summation frame group.

In particular, it may therefore be provided that redundant summation frames which contain the same messages contain identical values of the redundancy tag.

To that effect, the switch is able to eliminate redundant frame copies, preferably based on the IEEE 802.1CB redundancy mechanisms.

Furthermore, it may be provided that the first recovery frames contain unique identifiers, which are not identical to the unique identifier of their corresponding summation frames.

Accordingly, the switch recognizes that these recovery frames are not to be accepted (or consumed) and transmits these (first) recovery frames to the remaining, non-faulty nodes of the summation group, whose messages are not yet contained in the particular first recovery frame.

Furthermore, it may be provided that the second recovery frames each contain a unique identifier which is identical to the unique identifier of its corresponding summation frame.

The summation frame which a node is expecting but which it does not receive—and, as a reaction to this non-arrival of said summation frame sends a first recovery frame—is denoted as "corresponding summation frame to said recovery frame". Based on this unique identifier, which is identical to the unique identifier of its corresponding summation frame, the switch detects that the recovery frame is a second recovery frame which may be accepted and/or consumed.

It may be provided that one, two, or more nodes belong to the computer ring network, but do not belong to the summation group, wherein said node or nodes not belonging to the summation group are forwarding summation frames but do not process said summation frames.

It may be provided that one, two or more nodes of the summation group are not direct neighbors to other nodes participating in the summation group.

In other words: one or more nodes not participating in the summation group may be arranged between the left edge node and the right edge node, so that at least two, or more, node participating in the summation group may be "separated" by one or more nodes not participating in the summation group.

It may be provided that according to item 1) the node which has detected the non-arrival of a right direction summation frame is expecting a first left direction recovery frame at a specific point in time or within a defined time frame after a specific point in time, and wherein said node generates and sends a second right direction recovery frame if it does not receive a first left direction recovery frame at said specific point in time or within said defined time frame, and wherein according to item 2) the node which has detected the non-arrival of a left direction summation frame is expecting a first right direction recovery frame at a specific point in time or within a defined time frame after a specific point in time, and wherein said node generates and sends a second left direction recovery frame if it does not receive a first right direction recovery frame at said specific point in time or within said defined time frame.

It may also be provided that in the case that the summation group comprises one, two or more nodes between the left edge node and the right edge node, said node or nodes between the edge nodes receive the right direction summation frame through their respective left side port and transmit said right direction summation frame through their respective right side port to their right neighbor, and wherein said node or nodes between the edge nodes receive the left direction summation frame through their respective right side port and transmit said left direction summation frame through their respective left side port to their right neighbor.

It may be provided that all nodes which are arranged between the node, that has detected the non-arrival of the left direction recovery frame, and the switch, which nodes (between the switch and the detecting node) would insert their message into a left direction summation frame, insert their messages into said second left direction recovery frame, and/or wherein all nodes which may be provided between the node, which has detected the non-arrival of the right direction recovery frame, and the switch, which nodes would insert their message into a right direction summation frame insert their messages into the second right direction recovery frame.

BRIEF DESCRIPTION OF THE DRAWINGS

In the following, in order to further demonstrate the present invention, illustrative and non-restrictive embodiments are discussed, as shown in the drawings, which show:

FIG. 3 the structure of a summation frame as used in the invention,

FIG. 4 a summation frame mechanism in a network according to FIG. 1,

FIG. 5 the network according to FIG. 1, with one node exhibiting a failure, FIG. 6 a recovery frame mechanism in a network as shown in FIG. 4, FIG. 7 a network with two nodes exhibiting a failure, FIG. 8 a further network with two nodes exhibiting a failure, FIG. 9 the network according to FIG. 1, with a connection between two nodes exhibiting a failure, and FIG. 10 another example based on the network according to FIG. 1, with a node exhibiting a failure.

DETAILED DESCRIPTION

In the following we discuss example realizations of many possible realizations of the invention. It is important to note that all statements and details described in the following are valid within the full scope of the invention and are not restricted to a specific example. Details only valid in connection with a specific embodiment are identified accordingly.

Figure 1:
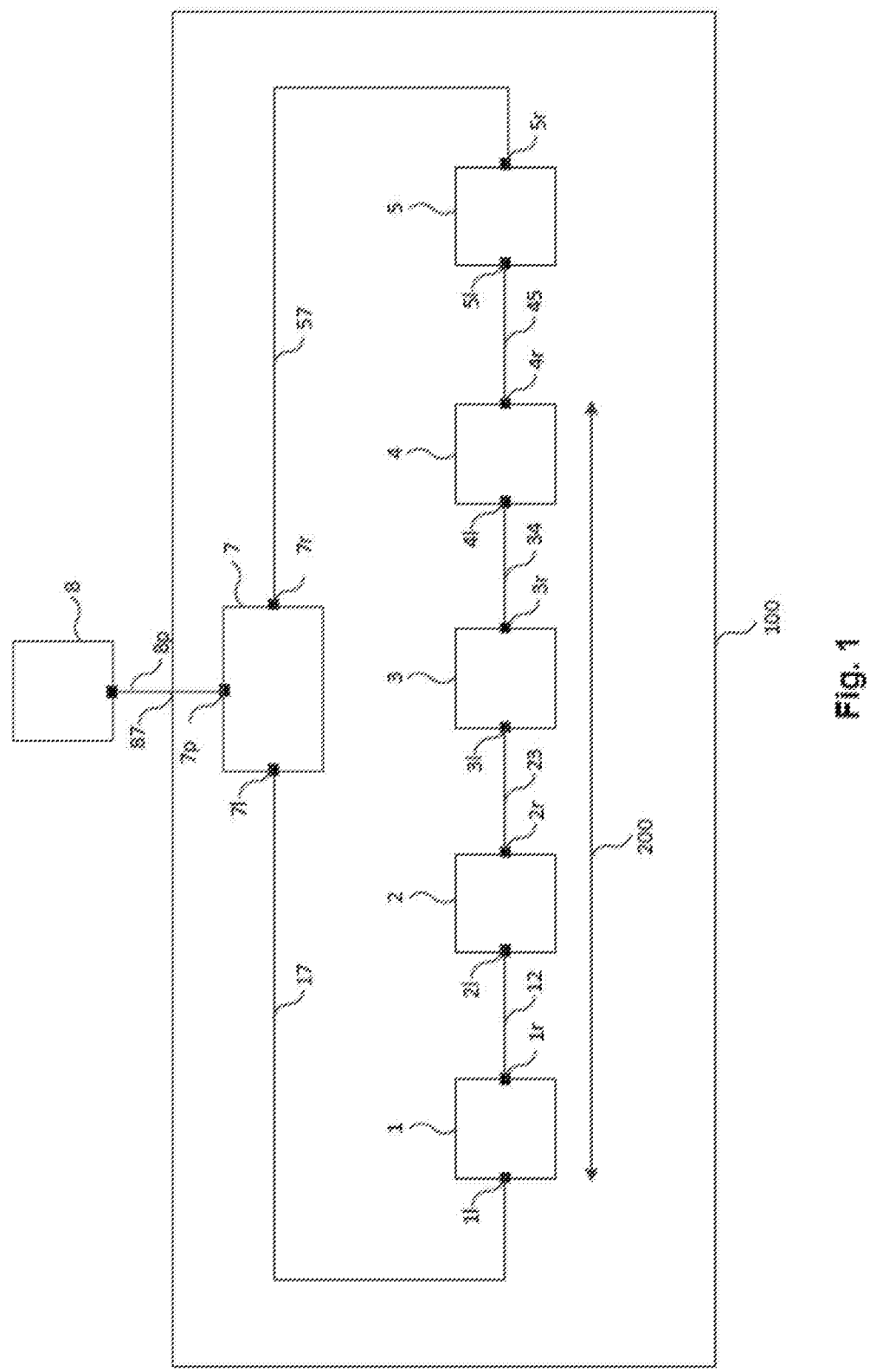
FIG. 1 an example of computer network according to the invention.

FIG. 1 depicts an example of a computer network 100 comprising five network nodes 1, 2, 3, 4, 5 connected in a ring topology. Furthermore, the ring comprises a switch 7, which in this example is connected with a node 8, which is acting as consumer.

In the context of this text, the term "switch" means switch, or router, or bridge. The term "switch" may also denote any network device which is capable of executing the necessary functions described in connection with the invention described.

Each node 1, 2, 3, 4, 5 and the switch 7 comprises one left-side port 1*l*, 2*l*, 3*l*, 4*l*, 5*l*, 7*l* to connect to its left-side neighbor and one right-side port 1*r*, 2*r*, 3*r*, 4*r*, 5*r*, 7*r* to connect to its right-side neighbor by bi-directional communication links 12, 23, 34, 45, 57, 17.

The switch 7 comprises a third port 7p, via which port 7p it is connected with a link 87 to a port 8p of the consumer 8. The link 87 may be a bi-directional link, but this is not necessary.

The nodes 1, 2, 3, 4 form a summation group 200, the node 5—in this example—does not belong to this summation group 200. Nodes 1, 2, 3, 4 belonging to the summation groups participate in the generation and processing of summation frames, which will be explained in more detail in the following.

The mechanisms of the invention will be explained in the following on the simple example shown in FIG. 1, where it will be assumed that one node of the summation group exhibits a failure.

Figure 2:
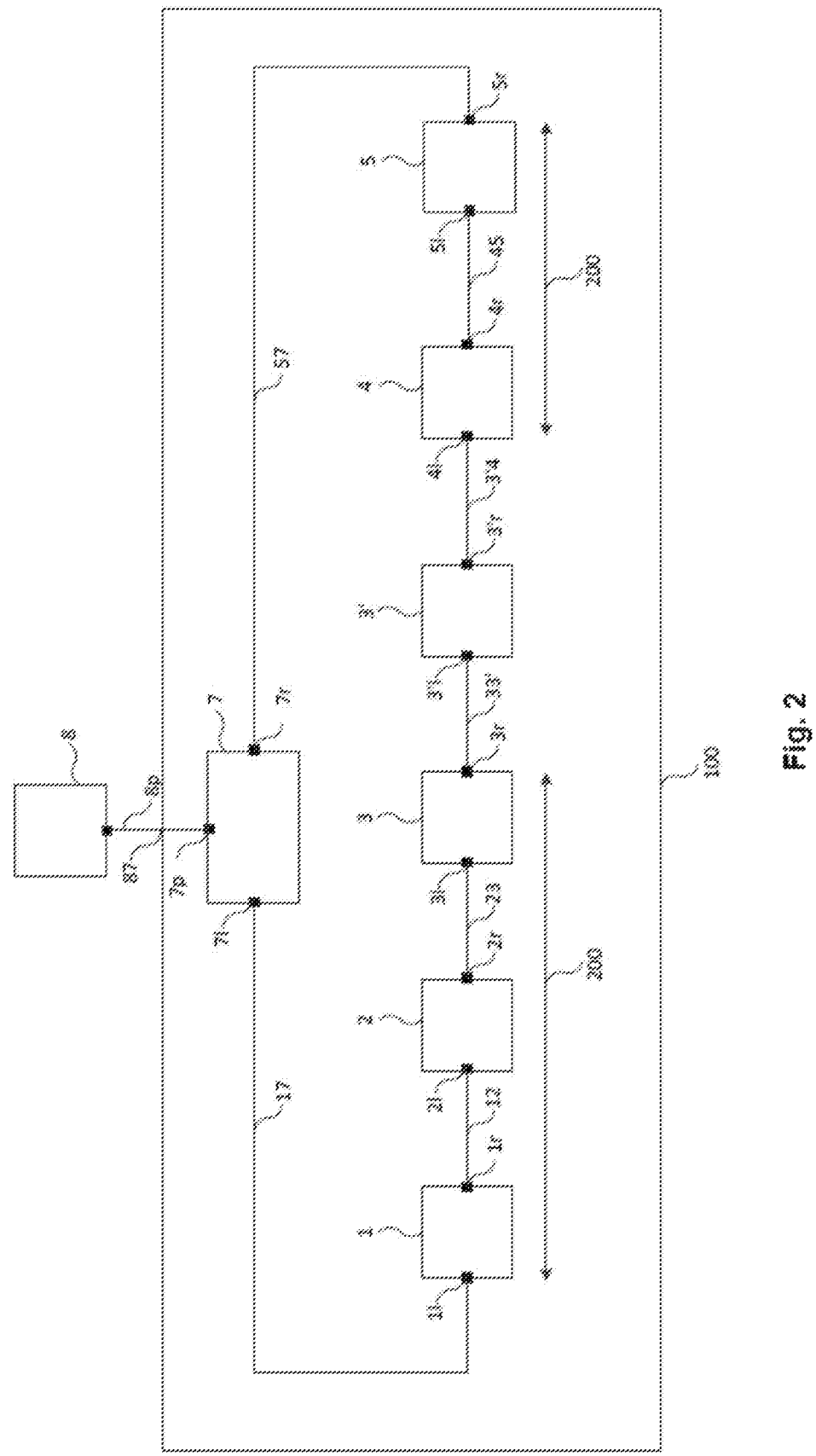
FIG. 2 a further example of a computer network according to the invention.

These mechanisms, however, work identically also in more complex network arrangements. For example, FIG. 2 shows a network similar to the one shown in FIG. 1. In addition, the network 100 according to FIG. 2 comprises one additional node 3' (with ports 3'l, 3'r) and additional bi-directional links 33', 3'4 (whereas link 34 of FIG. 1 is missing), connecting the additional node 3' with node 3 and node 4, respectively. In this example, the nodes 1, 2, 3 and 4, 5 belong to one summation group, node 3' is lying within the summation group 200, but does not belong to the summation group 200. Now, the mechanism which will be explained in the following based on a network of FIG. 1, works also in a network according to FIG. 2, independently from the fact that a node of the summation group exhibits a failure or that the node 3', which is arranged within the summation group but does not belong to the summation group, exhibits a failure so that it does not transmit frames which it receives from a node (since, for example it is not capable of transmitting anymore, or since it is not even capable of accepting frames anymore form a neighbor node).

Now, getting back to FIG. 1, as mentioned above, nodes 1, 2, 3, 4 of the summation group participate in the generation and processing of summation frames FR.

FIG. 3 shows an example of such a summation frame FR. The summation frame FR consist of the fields preamble PRM, Ethernet header HEAD, payload PL and frame check sequence FCS. These fields are predetermined by the Ethernet standard.

The payload PL comprises messages SM1, SM2, SM3, SM4. These messages are inserted by the nodes 1, 2, 3, 4 participating in the summation group 200 into specific positions P1, P2, P3, P4 of the summation frame FR. In the example shown in FIG. 3, node 1 has inserted a message SM1 into position P1, node 2 has inserted a message SM2 into position P2, node 3 has inserted a message SM3 into position P3, and node 4 has inserted a message SM4 into position P4.

As shown in FIG. 4, the method explained in this invention generates two redundant copies of the summation frame. The first node in the summation group 200, node 1, the so-called "left edge" node generates a so-called "first" ("right direction") summation frame F14, for example at a scheduled time T1, inserts its message SM1 at the beginning of the frame (position P1), and sends it on its right-side port 1r towards the right neighbor node 2. This node, nodes 2 receives this first summation frame F14 on its left-side port 21, inserts its message SM2 and sends the first summation frame F14 on its right-side port 2r to its right-side neighbor node, node 3, etc.

The node at the other end of the summation frame group 200, node 4, the so-called "right edge" node, creates a so-called "second" ("left direction") summation frame F41, inserts its message SM4 at the end of the frame (position P4), and sends it on its left-side port 4l towards its left neighbor, node 3. This node 3 receives the summation frame F41 on its right-side port 3r, inserts its message SM3 on position P3 and sends it on its left-side port 3l to its left-side neighbor, node 2, etc. All other participating nodes insert their sub-messages at the same position in the two summation frames F14, F4, independently of the direction of the frame. For example, the second node from the left, node 2, inserts its message SM2 on the second place P2 in the frame's payload PL both in the first summation frame F14 coming from the left ("right direction summation frame"), as well as in the second summation frame F41 coming from the right ("left direction summation frame").

In order to eliminate redundant frame copies, a specific mechanism, preferably the mechanisms from IEEE 802.1CB is used. According to such a specific mechanism the left edge node 1 sends the left direction summation frame F41 to the switch 7, and the right edge node 4 sends the summation frame F14 to the switch 7. To ensure that the switch 7, for example a IEEE 802.1CB switch, can eliminate redundant copies of the summation frames and that only one copy is forwarded to the final consumer 8, preferably a redundancy tag is added to the summation frames F14, F41. A suitable mechanism used is described in the introductory part of the general description.

In particular, to avoid having sequence number problems, the redundancy tag is preferably inserted by the last edge node in the direction of the consuming node. Each edge node 1, 4 creating a summation frame F14, F41 inserts a valid redundancy tag with the current value of its sequence counter. The last edge node reads the sequence counter from the received summation frame and if the value is higher than its current sequence counter, it takes over the new value read from the frame.

After the comparison, it inserts a redundancy tag into the summation frame. To ensure that both summation frames F14, F41 leaving the summation frame group 200 are identical, the edge nodes 1, 4 preferably introduce the same locally administered MAC address as source address. This MAC address does not match a physical device, but the summation frame group 200.

Accordingly, the switch 7 receives the two redundant summation frames F14 and F41 on its ports 7l, 7r, interprets these two redundant frame copies F14, F41, and sends only one resulting frame FS0 to the receiver ("consumer") node 8.

Now, in the case of a ring failure, in particular within the summation frame group, that means in the case of a failure of one (or more) node(s) of the summation group or of a node which is arranged within the summation group but it not part of the summation group (see for example FIG. 2, here the node 3' is arranged within the summation group 200, but is not part of the summation group such a node is separating the summation group 200 into two parts), or in the case of a failure of a connection connecting two nodes mentioned before, according to the invention a frame recovery mechanism is being used.

FIG. 5 illustrates an example architecture based on the network shown in FIG. 1, and FIG. 6 shows the frame recovery mechanism for the case shown in FIG. 5.

According to FIG. 5, the node 3 of the summation group 200 exhibits a failure, so that right direction summation frames F14 cannot be transmitted to the node 4, and left direction summation frame F41 cannot be transmitted to the node 2 of the summation frame.

Now, according to FIG. 6, the node 2 is expecting summation frame F41 and node 4 is expecting summation frame F14 from node 3, but since node 3 is not forwarding any frames, the nodes 2, 4 accordingly do not receive the expected summation frame. As a reaction, the nodes 2, 4, trigger the sending of a first recovery frames RF21 (node 2) and RF41 (node 4) at the scheduled points in time T21, T41. These first recovery frames RF21, RF41 are created with the expected length according to the expected summation frame to allow all remaining nodes to insert their message and simplify the decoding of the frame at the consuming node 8 (or at the switch 7).

The recovery frame F41 is sent from node 4 via node 5 to the switch, which transmits the recovery frame via node 1 to node 2, which receives the first recovery frame RF41 on its left-side port 2. Node 2 then creates a second recovery frame RF22 at a scheduled time T22, inserts all content from the received first recovery frame RF41 (that is message SM4 of node 4), inserts its message SM2, and sends said second recovery frame RF22 via its left-side port 21 to its left neighbor node 1. Node 1 inserts its message SM1 and sends this second recovery frame RF22 to the switch 7.

Similarly, node 4 receives the first recovery frame RF21 of node 2 on its right-side port 4*r*. In detail, node 2 sends the first recovery frame RF21 to node SM1, which inserts its message SM1, transmits the first recovery frame RF21 to the switch 7, which transmits the first recovery frame RF21 via node 5 to node 4.

Now, node 4 creates a second recovery frame F42 at a scheduled time T42, inserts all content from the received first recovery frame RF21, that is the messages SM1, SM2 of nodes 1, 2, inserts its message SM4, and sends it via its right-side port 4*r* to node 5, which transmits this second recovery frame to the switch 7. This mechanism is necessary to ensure that the recovery frames reach the other part of the summation frame group. Such, the two second recovery frames F22, F42 are redundant frame copies and a mechanisms such as the one known from IEEE 802.1CB can be used to remove the redundancy in a suitable switch 7.

Since the nodes are configured to insert their messages on the same position in the recovery frames, especially in the second recovery frame, the switch 7 will receive two identical copies of the second recovery frame, from which copies one will be used instead of the summation frames which the switch did not receive.

Finally, FIG. 7 and FIG. 8 depict two possible arrangements of networks.

FIG. 7 shows a network similar to the one in FIG. 1, with nodes 1-5 and an additional node 3' arranged between node 3 and node 4. It is assumed that nodes 1, 2, 3, 3', 4 form a summation group 200 and that node 3, 3' exhibit a failure. In this case the recovery frame mechanism works fully identical to the one as described in connection with FIG. 6.

FIG. 8 shows a further extension of the network of FIG. 7, with yet another additional node 3". The summation group consists of nodes 1, 2, 3, 3', 3", 4, and it is assumed that nodes 3, 3" exhibit a failure. In this case the recovery frame mechanism works fully identical to the one as described in connection with FIG. 6.

Even in the case that, for example node 3' (which does not exhibit a failure) and/or node 3" and/or node 3 (which both are assumed to exhibit a failure in the example according to FIG. 8) in the network of FIG. 8 do not belong to the summation group, the recovery frame mechanism would follow the principles as described in connection with FIG. 8.

FIG. 9 shows a network according to FIG. 1, with a failure in the connection (communication link) 34, which connects node 3 with node 4. In this case the recovery frame mechanism works identical to the mechanism described in connection with FIG. 5. The only difference to the situation described in connection with FIG. 5 is that in FIG. 9 the node 3 play the role of the node 2 in FIG. 5. Accordingly, in failure case of FIG. 9 node 4 generates and sends a first right direction recovery frame, node 3 generates and sends a first left direction recovery frame. After having received the first left direction recovery frame node 4 generates a second right direction recovery frame, which is sent to the switch 7, as described in detail in connection with FIG. 5. Additionally, after having received the first right direction recovery frame node 3 generates a second left direction recovery frame, which is sent to the switch 7, as described in detail in connection with FIG. 5.

Finally, FIG. 10 shows a specific situation corresponding to item 1) of claim 1, in which an edge node of the summation group 200 exhibits a failure. In the example shown the left edge node 1 exhibits a failure. In this situation the node 2 generates and sends a right direction recovery frame, as described in connection with FIG. 5 (where the node 4 generates and sends the right direction recovery frame). The right direction recovery frame passes the switch 7 and travels in direction to the "remaining" nodes of the summation group 200 on the opposite side of the switch. However, in the specific situation as shown in FIG. 10 no remaining node exists, so that the first recovery frame is lost.

Additionally, as no node is present in the summation group which can detect a missing left direction summation frame, since there is no node in the summation group which is arranged left of the node 1, which is exhibiting a failure, no left direction recover frame is generated.

Node 2, which has transmitted the first right direction recovery frame, is expecting a first right direction recovery frame. However, in this case a first right direction recovery frame (and according also a second right direction recovery frame) does not exist. Node 2 is expecting a first right direction recovery frame at a specific point in time (or within a defined time frame after said point in time). Since said first right direction recovery frame does not arrive at said specific point in time (or within said time frame), node 2 generates and sends a second recovery frame to the switch 7. In detail, node 2 inserts its message SM2 into the recovery frame, transmits the second recovery frame to node 3, which inserts its message SM3, node 4 inserts its message SM4, and then the switch 7 receives this second right direction recovery frame, which it can handle as described in connection with FIG. 5. The only difference now is that there is no second left direction recovery frame, so that no redundancy mechanism has to be executed in the switch.

Item 2) of claim 1—here node 4 would exhibit a failure—works analogous.

Furthermore, the case that the summation group consists of only two nodes, which are directly connected to each other with a communication link, and where one of the nodes exhibits a failure, can be described based on the mechanism described in connection with FIG. 10.

The invention claimed is:

1. A method for fault tolerant message transmission in a ring network, where said ring network comprises nodes (1, 2, 3, 4, 5) and connections (12, 23, 34, 45), wherein said nodes (1, 2, 3, 4, 5) are connected by the connections (12, 23, 34, 45) to form the ring network (100), the method comprising:

forming two or more nodes (1, 2, 3, 4) in said ring network (100) as a summation group (200), wherein said summation group (200) includes one left edge node (1), one right edge node (4), and zero, one, or more nodes (2, 3) between said left and right edge nodes (1, 4), wherein for transmitting messages (SM1, SM2, SM3, SM4) from the two or more nodes (1, 2, 3, 4) of the summation group (200) to a switch (7) in the ring network, the left edge node (1) of the summation group (200) generates a right direction summation frame (F14) and sends said right direction summation frame (F14) through its right side port (1r) towards the right edge node (4), wherein the right edge node (4) of the summation group (200) generates a left direction summation frame (F41) and sends said left direction summation frame (F41) through its left-side port (41) towards the right side port (1r) of the left edge node (1), wherein each of the nodes (1, 2, 3) in the summation group (200) inserts, before sending the right direction summation frame to its right-side neighbor node (2, 3, 4) or the right edge node (4) to the switch (7), its message (SM1, SM2, SM3, SM4), which is intended by the respective node (1, 2, 3, 4) for being transmitted to the switch (7), into the right direction summation frame and forwards the right direction summation frame to its right-side neighbor node (2, 3, 4) or to the switch (7), wherein each of the nodes (4, 3, 2) in the summation group (200) inserts, before sending the left direction summation frame to its left-side neighbor node (3, 2, 1) or the left edge node (1) to the switch (7), its message (SM4, SM3, SM2, SM1), which is intended by the respective node (1, 2, 3,4) for being transmitted to the switch (7), into the left direction summation frame and forwards the left direction summation frame to its left-side neighbor node (2, 3, 4) or to the switch (7), and wherein a node in the summation group (200) which detects a non-arrival of the right direction summation frame, at a defined point in time or within a period of time from after the defined point in time from its left-side neighbor node, generates a first right direction recovery frame (RF41), inserts its message (SM4) into said first right direction recovery frame (RF41), and sends the first right direction recovery frame (RF41) rightwards, and wherein only nodes which would insert their message into the right direction summation frame insert their message into the first right direction recovery frame (RF41) moving rightwards, and/or a node participating in the summation group (200) which determines the non-arrival of the left direction summation frame, at a defined point in time or within a period of time after the defined point in time from its right-side neighbor node, generates a first left direction recovery frame (RF21), inserts its message (SM2) into said first left direction recovery frame, and sends the first left direction recovery frame (RF21) leftwards, wherein only nodes which would insert their message (SM1) into the left direction summation frame insert their message (SM1) into the first left-direction recovery frame (RF21) moving leftwards, and wherein 1) in the case that only one node of the nodes has detected the non-arrival of a summation frame, wherein the summation frame is the right direction summation frame, said one node, after sending the first right direction recovery frame and receiving and consuming the first left direction recovery frame, generates a second right direction recovery frame, inserts its messages and all messages included in the first left direction recovery frame into said second right direction recovery frame, and sends said second right direction recovery frame to the switch (7), 2) in the case that only one node of the nodes has detected the non-arrival of the summation frame, wherein the summation frame is the left direction summation frame, said one node, after sending the first left direction recovery frame and receiving and consuming the first right direction recovery frame, generates a second left direction recovery frame, inserts its messages and all messages included in the first right direction recovery frame into said second left direction recovery frame, and sends said second left direction recovery frame to the switch (7), and/or 3) in the case that a node has detected the non-arrival of the right direction summation frame and a node has detected the non-arrival of the left direction summation frame, the first right direction recovery frame (RF41) is received by the node which has determined the non-arrival of the left direction summation frame, and the first left direction recovery frame (RF21) is received by the node which has determined the non-arrival of the right direction summation frame, wherein the node (2) which has detected the non-arrival of the left direction summation frame consumes the first right direction recovery frame (RF41), generates the second left direction recovery frame (RF22), inserts its message (SM2) and all messages (SM4) included in said first right direction recovery frame (RF41) into said second left direction recovery frame (RF22), and transmits said second left direction recovery frame (RF22) to the switch (7), and wherein the node (4) which has detected the non-arrival of the right direction summation frame consumes the first left direction recovery frame (RF21), generates the second right direction recovery frame (RF42), inserts its message (SM4) and all messages included in said first left direction recovery frame (RF21) into said second right direction recovery frame (RF42), and transmits said second right direction recovery frame (RF42) to the switch (7).

2. The method according to claim 1, wherein the switch (7) according to 1) and 2) accepts and/or consumes the right or left direction second recovery frame which it receives, or according to 3) accepts and/or consumes at least one of the second right or left direction recovery frames (RF22, RF42) which the switch (7) receives.

3. The method according to claim 2, wherein the switch (7) according to 3) only consumes and/or accepts at least one or one of the second right or left direction recovery frames (RF42, RF22), if said second right or left direction recovery frames received by the switch (7) are identical.

4. The method according to claim 1, wherein nodes (1, 2, 3, 4) of the summation group write their message (SM1, SM2, SM3, SM4) into a well-defined position in the right and left direction summation frames (F14, F41).

5. The method according to claim 4, wherein each node (1, 2, 3, 4) of the summation group writes its message (SM1, SM2, SM3, SM4) into the well-defined position of the right-direction summation frame (F14), which is identical to the well-defined position into which said node (1, 2, 3, 4) writes its message (SM1, SM2, SM3, SM4) into the left-direction summation frame (F41).

6. The method according to claim 1, wherein each node (1, 2, 4) of the summation group writes its message (SM1, SM2, SM4) into the first or second left or right direction recovery frame (RF41, RF21, RF42, RF22) on the same position as it would write said message (SM1, SM2, SM4) into the right or left direction summation frame (F14, F41).

7. The method according to claim 1, wherein the nodes (1, 2, 3, 4) in the summation group (200) are synchronized to a clock in the ring network.

8. The method according to claim 7, wherein the right and left edge nodes (1, 4) generate and/or send the right and left direction summation frames (F14, F41) and/or the first and second left and right direction recovery frames at scheduled points in time.

9. The method according to claim 8, wherein nodes (1, 2, 3, 4) of the summation group receive the right and left direction summation frames (F14, F41) at scheduled points in time, and wherein a node (2, 4) sends the first left or right recovery frame (RF21, RF41) if it does not receive the right or left direction summation frame at a scheduled point in time or within a defined time interval after said scheduled point in time.

10. The method according to claim 1, wherein each right and left direction summation frame (F14, F41) belongs to a data stream, wherein this data stream is identified by a unique identifier with a unique combination of Ethernet header, IP, and UDP header.

11. The method according to claim 10, wherein a redundancy tag is added to the right and left direction summation frames (F14, F41) and/or to the second right and left direction recovery fames (RF42, RF22) to enable IEEE 802.1CB redundancy mechanisms.

12. The method according to claim 11, wherein redundant right and left summation frames (F14, F41), which include identical messages (SM1, SM2, SM3, SM4), include identical values of the redundancy tag.

13. The method according to claim 12, wherein the first right and left recovery frames (RF21, RF41) include unique identifiers, which are not identical to the unique identifier of their corresponding summation frames.

14. The method according to claim 13, wherein the second right and left direction recovery frames (RF22, RF42) each include a unique identifier which is identical to the unique identifier of its corresponding summation frame.

15. The method according to claim 1, wherein one, two, or more nodes (5) belong to the computer ring network (100), but do not belong to the summation group (200), wherein said node (5) or nodes not belonging to the summation group (200) are forwarding summation frames but do not process said summation frames.

16. The method according to claim 1, wherein one, two or more nodes of the summation group (200) are not direct neighbors to other nodes participating in the summation group (200).

17. The method according to claim 1, wherein
according to item 1), the node which has detected the non-arrival of the right direction summation frame is expecting the first left direction recovery frame at the specific point in time or within the defined time frame after the specific point in time, and wherein said node generates and sends the second right direction recovery frame if it does not receive the first left direction recovery frame at said specific point in time or within said defined time frame, and
according to item 2), the node which has detected the non-arrival of the left direction summation frame is expecting the first right direction recovery frame at the specific point in time or within the defined time frame after the specific point in time, and wherein said node generates and sends the second left direction recovery frame if it does not receive the first right direction recovery frame at said specific point in time or within said defined time frame.

18. The method according to claim 1, wherein the summation group (200) comprises one, two, or more nodes (2, 3) between the left edge node (1) and the right edge node (4), said node or nodes (2, 3) between the left and right edge nodes (1, 4) receive the right direction summation frame (F14) through their respective left side port (21, 31) and transmit said right direction summation frame (F14) through their respective right side port (2r, 3r) to their right neighbor (3, 4), and wherein said node or nodes (2, 3) between the left and right edge nodes (1, 4) receive the left direction summation frame (F41) through their respective right side port (3r, 2r) and transmit said left direction summation frame (F41) through their respective left side port (31, 21) to their right neighbor (2, 1).

19. The method according to claim 1, wherein all nodes which are provided between the node (2) that has detected the non-arrival of the left direction recovery frame and the switch (7), insert their message into the left direction summation frame and insert their messages (SM1) into said second left direction recovery frame, and/or wherein all nodes which may be provided between the node (4)that has detected the non-arrival of the right direction recovery frame and the switch (7), insert their message into a right direction summation frame and insert their messages into the second right direction recovery frame.

20. A time-triggered ring network for fault tolerant message transmission, wherein said ring network comprises nodes (1, 2, 3, 4, 5) and connections (12, 23, 34, 45), wherein said nodes (1, 2, 3, 4, 5) are connected by the connections (12, 23, 34, 45) to form the ring network (100), the network comprising:
two or more nodes (1, 2, 3, 4) in said ring network (100) form a summation group (200), wherein said summation group (200) includes one left edge node (1), one right edge node (4), and zero, one, or more nodes (2, 3) between said left and right edge nodes (1, 4),
wherein for transmitting messages (SM1, SM2, SM3, SM4) from the nodes (1, 2, 3, 4) of the summation group (200) to a switch (7) in the ring network, the left edge node (1) of the summation group (200) is configured to generate a right direction summation frame (F14) and to send said right direction summation frame (F14) through its right side port (1r) towards the right edge node (4),
wherein the right edge node (4) of the summation group (200) is configured to generate a left direction summation frame (F41) and to send said left direction frame (F41) through its left-side port (41) towards the right side port (1r) of the left edge node (1),
wherein each of the nodes (1, 2, 3) in the summation group (200) is configured to insert, before sending the right direction summation frame to its right-side neighbor node (2, 3, 4) or the right edge node (4) to the switch (7), its message (SM1, SM2, SM3, SM4), which is intended by the respective node (1, 2, 3, 4) for being transmitted to the switch (7), into the right direction summation frame and to forward the right direction summation frame to its right-side neighbor node (2, 3, 4) or to the switch (7),
wherein each of the nodes (4, 3, 2) in the summation group (200) is configured to insert, before sending the left direction summation frame to its left-side neighbor node (3, 2, 1) or the left edge node (1) to the switch (7), its message (SM4, SM3, SM2, SM1), which is intended by the respective node (1, 2, 3,4) for being transmitted to the switch (7), into the left direction summation frame and to forward the left direction summation frame to its left-side neighbor node (2, 3, 4) or to the switch (7), and wherein the nodes of the summation group are configured such that a node in the summation group (200) which detects a non-arrival of the right direction summation frame at a defined point in time or within a period of time from after the defined point in time from its left-side neighbor node, generates a first right direction recovery frame (RF41), inserts its message (SM4) into said right direction recovery frame (RF41), and sends the first right direction recovery frame (RF41) rightwards, and wherein the nodes of the summation group are configured such that only nodes of the summation group which would insert their message into a right direction summation frame insert their message into the right direction recovery frame (RF41) moving rightwards, and/or the nodes of the summation group are configured such that a node in the summation group (200) which determines the non-arrival of the left direction summation frame at the defined point in time or within a period of time after the defined point in time from its right-side neighbor node, generates a first left direction recovery frame (RF21), inserts its message (SM2) into said first left direction recovery frame, and sends this first left direction recovery frame (RF21) leftwards, wherein the nodes of the summation group are configured such that only nodes which would insert their message (SM1) into the left direction summation frame insert their message (SM1) into the first left-direction recovery frame (RF21) moving leftwards, and wherein the nodes of the summation group are configured such that 1) in the case that only one node of the nodes has detected the non-arrival of a summation frame, wherein the summation frame is the right direction summation frame, said one node, after sending the first right direction recovery frame and receiving and consuming the first left direction recovery frame, generates a second right direction recovery frame, inserts its messages and all messages included in the first left direction recovery frame into said second right direction recovery frame, and sends said second right direction recovery frame to the switch (7), 2) in the case that only one node of the nodes has detected the non-arrival of a summation frame, wherein the summation frame is the left direction summation frame, said one node, after sending the first left direction recovery frame and receiving and consuming the first right direction recovery frame, generates a second left direction recovery frame, inserts its messages and all messages included in the first right direction recovery frame into said second left direction recovery frame, and sends said second left direction recovery frame to the switch (7), and/or 3) in the case that a node has detected the non-arrival of the right direction summation frame and a node has detected the non-arrival of the left direction summation frame, the first right direction recovery frame (RF41) is received by the node which has determined the non-arrival of the left direction summation frame, and the first left direction recovery frame (RF21) is received by the node which has determined the non-arrival of the right direction summation frame, wherein the node (2) which has detected the non-arrival of the left direction summation frame consumes the first right direction recovery frame (RF41), generates the second left direction recovery frame (RF22), inserts its message (SM2) and all messages (SM4) included in said first right direction recovery frame (RF41) into said second left direction recovery frame (RF22), and transmits said second left direction recovery frame (RF22) to the switch (7), and wherein the node (4) which has detected the non-arrival of the right direction summation frame consumes the first left direction recovery frame (RF21), generates the second right direction recovery frame (RF42), inserts its message (SM4) and all messages included in said first left direction recovery frame (RF21) into said second right direction recovery frame (RF42), and transmits said second right direction recovery frame (RF42) to the switch (7).

\* \* \* \* \*